United States Patent
Young et al.

(10) Patent No.: US 12,425,922 B2
(45) Date of Patent: Sep. 23, 2025

(54) SYSTEMS AND METHODS FOR SUPPORTING NETWORK SLICE SERVICES USING TRANSPORT DEVICES

(71) Applicant: Verizon Patent and Licensing Inc., Basking Ridge, NJ (US)

(72) Inventors: Kristen Sydney Young, Mine Hill, NJ (US); Rishi Tandon, Haryana (IN); Sandeep Sarma, Tamil Nadu (IN); Hans Raj Nahata, New Providence, NJ (US); Yueping Zhang, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 369 days.

(21) Appl. No.: 18/054,256

(22) Filed: Nov. 10, 2022

(65) Prior Publication Data

US 2024/0163724 A1    May 16, 2024

(51) Int. Cl.
*H04W 28/10*    (2009.01)
*H04W 28/02*    (2009.01)

(52) U.S. Cl.
CPC ....... *H04W 28/10* (2013.01); *H04W 28/0278* (2013.01)

(58) Field of Classification Search
CPC .......... H04L 41/0893; H04L 47/2483; H04W 24/02; H04W 28/0268; H04W 28/0278; H04W 28/10; H04W 76/11; H04W 76/12
USPC ......................................... 370/252, 329, 331
See application file for complete search history.

(56) References Cited

U.S. PATENT DOCUMENTS

2020/0015293 A1*  1/2020  Wang .................... H04W 76/12
2022/0247692 A1*  8/2022  Chi ..................... H04L 47/2483

* cited by examiner

*Primary Examiner* — Harun Chowdhury

(57) ABSTRACT

A system comprises one or more devices. The devices are configured to: receive a context associated with a flow of packets between a User Equipment device (UE) and a network slice in a wireless network; obtain one or more policy rules; apply the policy rules to the context and a model of a transport device to generate or update a map that assigns one or more contexts to queues within the transport device; and send the map to the transport device. The transport device is configured to: adjust parameters of the queues based on the map; shape traffic from each of the queues; schedule packets from the queues; and forward the scheduled packets.

20 Claims, 11 Drawing Sheets

FIG. 6

| 5QI (GBR RESOURCE TYPES) | QoS FLOW PROPERTIES ||  DRB ID |
|---|---|---|---|
| | MAX COMMIT RATE (Mbps) | MIN PACKET DELAY BUDGET PER HOP (ms) | |
| 1 | 25 | 10 | 1 |
| 2 | 5 | 5 | 2 |
| 3 | 10 | 20 | 3 |
| 4 | 20 | 22 | 3 |
| 5 | 30 | 10 | 1 |
| 6 | 15 | 20 | 3 |
| 66 | 4 | 5 | 2 |

| SERVICE | SLICE ID | SLICE PRIORITY | 5QIs FOR SLICE |
|---|---|---|---|
| eMBB GOLD | 1 | 1 | 6 |
| eMBB SILVER | 2 | 8 | 1, 2, 5, 8 |
| PTT | 7 | 3 | 66 |
| HD VIDEO | 10 | 5 | 4 |

| UE ID/SLICE ID | SLICE ID / 5QI ID | 5QI PRIORITY | SLICE PRIORITY | DRB |
|---|---|---|---|---|
| 1/10, 1 | 10/4, 1/6 | 50, 60 | 5, 6 | 3 |
| 2/2 | 2/1 | 20 | 6 | 1 |
| 3/7 | 7.66 | 40 | 3 | 2 |

850

SYSTEMS AND METHODS FOR SUPPORTING NETWORK SLICE SERVICES USING TRANSPORT DEVICES

BACKGROUND INFORMATION

General Packet Radio Service (GPRS) is a radio communication standard for mobile devices. When a mobile device establishes a connection with a base station, the mobile device creates a logical tunnel between the mobile device and the base station in accordance with a GPRS tunneling protocol (GTP)—a tunneling protocol based on the GPRS. The logical tunnel is referred to as a GTP tunnel.

A GTP tunnel may include a GTP-User Plane (GTP-U) tunnel. The GTP-U tunnel carries encapsulated protocol data units (PDUs) between the endpoints. The header of a PDU of a GTP-U tunnel may include information that characterizes the GTP-U tunnel and the PDU, such as a Tunnel Endpoint Identifier (TEID) that indicates to which tunnel the PDU belongs.

BRIEF DESCRIPTION OF THE DRAWINGS

FIG. 6 illustrates a table that summarizes how a transport system maps flows to data radio bearers (DRBs), according to an implementation;

FIG. 8A shows an example mapping between different network services and 5QIs;

FIG. 8B depicts an example mapping between a combination, of User Equipment device (UE) and network slice, and a DRB, according to an implementation;

DETAILED DESCRIPTION

The following detailed description refers to the accompanying drawings. The same reference numbers in different drawings may identify the same or similar elements.

A User Equipment device (UE) and a cellular network may conduct a protocol data unit (PDU) session between them over a GTP-U tunnel (or simply a GTP-U). The GTP-U may be characterized by a context for the PDU session. Transport domain components (e.g., components associated with data transport between a Central Unit-User Plane (CU-CP) and a Distributed Unit (DU), gNB, etc.), however, do not typically expose the context at the transport domain level. In the absence of such information at the transport domain level, it is difficult to achieve a fine-grained control over transport resources to enforce network slice-based Service Level Agreements (SLAs).

Network components exchange various identifiers (IDs), such as a network slice-ID, a Fifth Generation Quality of Service ID (5QI), a User Equipment ID or UE device ID (UE-ID), and a Data Radio Bearer ID (DRB-ID) during creation of a GTP-U tunnel, as part of bearer setup procedures in the mid-haul network. These identifiers may represent traffic per network slice, per QoS, per flow, per UE, and/or per DRB, and may provide a context for the session. The context is herein referred to as a GTP-U tunnel context (also referred to as a GTP-U context, a PDU session context, a PDU context, or simply as a context). By having an access network (e.g., a radio access network (RAN)) expose GTP-U tunnel contexts, it is possible to leverage the GTP-U contexts for 5G network slice deployments, to ensure adherence to 5G network slice-based SLAs at the transport level.

The systems and methods described herein relate to supporting network slice services using transport devices. More particularly, a transport system may comprise at least one transport controller and one or more transport devices (also simply referred to as transport devices). A transport controller receives GTP tunnel contexts from a radio access network and uses the contexts to generate, for each transport device, a corresponding map of the contexts to queues within the transport device. The transport controller sends the generated map to each transport device. Each transport device uses the map to achieve a fine-grained control over its traffic shaping and packet scheduling to effectively meet SLAs for each service flow to/from network slices.

Figure 1:
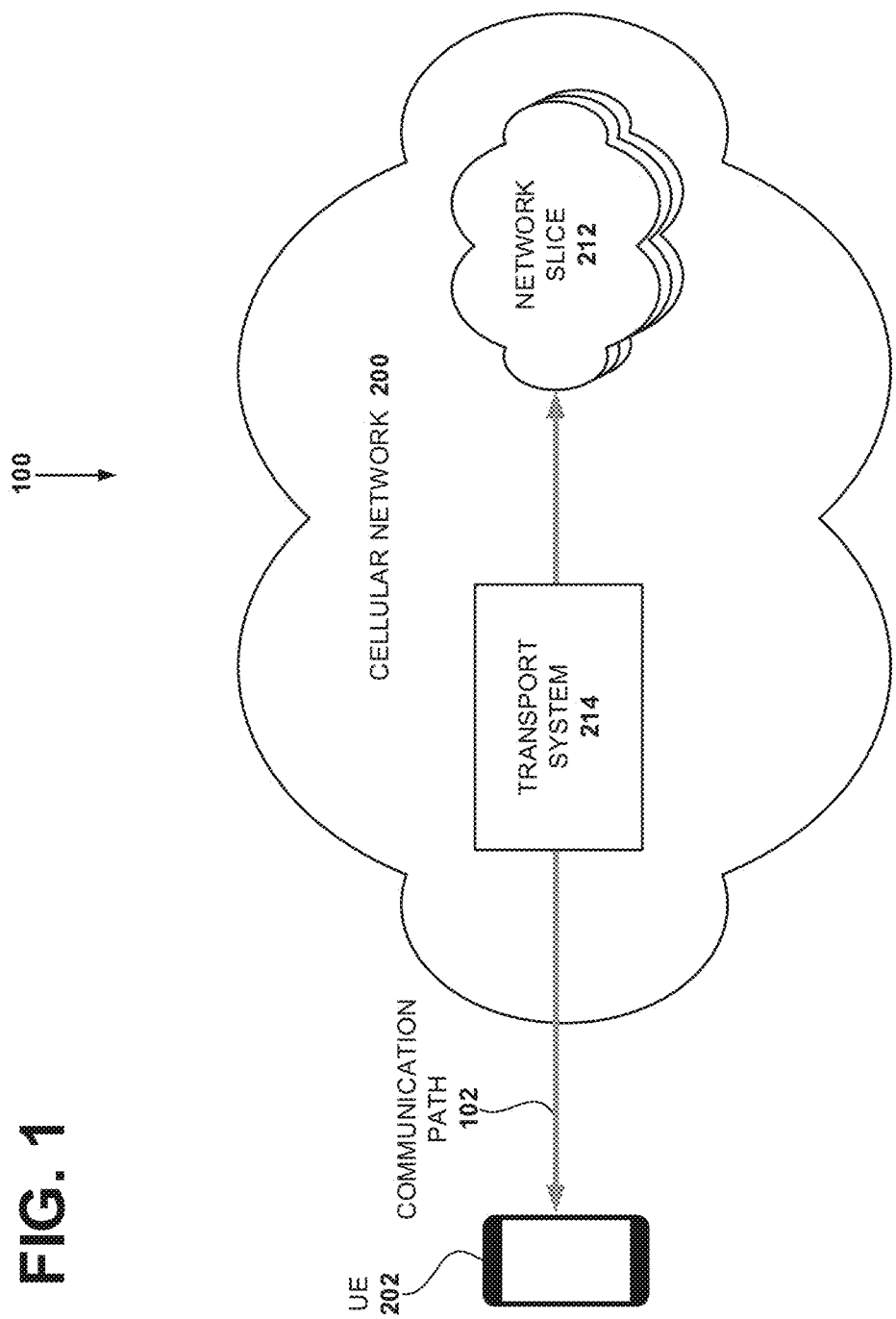
FIG. 1 illustrates an overview of an exemplary transport system for supporting network slice services using transport devices.

FIG. 1 illustrates an overview of an exemplary transport system, according to an implementation. As shown, an environment 100 includes a cellular network 200 and a UE 202 (e.g., a smart phone). Cellular network 200 may include network slices 212 (e.g., a logical network) and a transport system 214. Network 200, UE 202, network slices 212, and transport system 214 are described in greater detail below with reference to FIGS. 2-11. In FIG. 1, when or after UE 202 establishes a communication path 102 to a particular network slice 212 to receive a service, transport system 214 obtains a context from part of 102. Transport system 214 uses the context to achieve a fine-grained control over various flows to/from UE 202 from/to the network slice 212.

Figure 2:
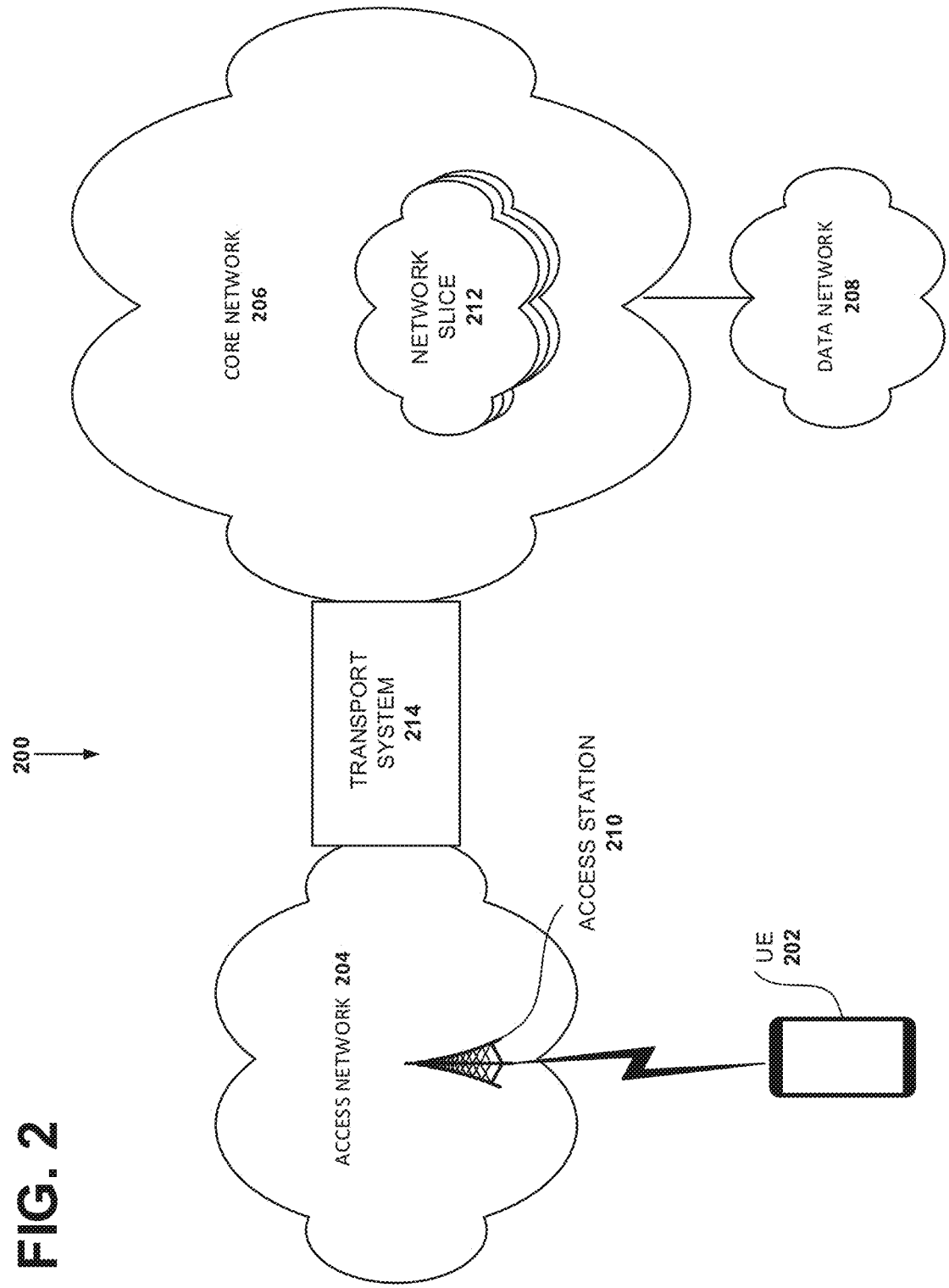
FIG. 2 illustrates an exemplary network in which a transport system may be implemented, according to an implementation.

FIG. 2 illustrates network 200 in which transport system 214 of FIG. 1 may be implemented. As shown, network 200 may include a UE 202, an access network 204, a core network 206, and a data network 208. UE 202 may include a wireless computational, communication device. Examples of UE 202 include: a smart phone; a tablet device; a wearable computer device (e.g., a smart watch); a global positioning system (GPS) device; a laptop computer; a media playing device; a portable gaming system; an autonomous vehicle navigation system; a sensor, such as a pressure sensor; and an Internet-of-Things (IoT) device. In some implementations, UE 202 may correspond to a wireless Machine-Type-Communication (MTC) device that communicates with other devices over a machine-to-machine (M2M) interface, such as LTE-M or Category M1 (CAT-M1) devices and Narrow Band (NB)-IoT devices.

Access network 204 may allow UE 202 to access core network 206. To do so, access network 204 may establish and maintain, with participation from UE 202, an over-the-air channel with UE 202; and maintain backhaul channels with core network 206. Access network 204 may relay information through these channels, from UE 202 to core network 206 and vice versa. Access network 204 may include a Long-term Evolution (LTE) radio network and/or a Fifth Generation (5G) radio network or other advanced radio network. These networks may include many central units (CUs), distributed units (DUs), radio units (RUs), and wireless stations, one of which is illustrated in FIG. 2 as access station 210 for establishing and maintaining over-the-air channel with UE 202. Access station 210 may include a 4G, 5G, or another type of base station (e.g., eNB, gNB, etc.) that comprise one or more radio frequency (RF) transceivers. In some implementations, access station 210 may be part of an evolved Universal Mobile Telecommunications Service (UMTS) Terrestrial Network (eUTRAN).

Core network 206 may manage communication sessions of subscribers connecting to core network 206 via access network 204. For example, core network 206 may establish an Internet Protocol (IP) connection between UEs 202 and data network 208. In some implementations, core network 206 may include a 5G core network. In other implementations, core network 206 may include a 4G core network (e.g., an evolved packet core (EPC) network) or another type of core network.

The components of core network 206 may be implemented as dedicated hardware components or as virtualized functions implemented on top of a common shared physical infrastructure using Software Defined Networking (SDN). For example, an SDN controller may implement one or more of the components of core network 206 using an adapter implementing a Virtual Network Function (VNF) virtual machine, a container, an event driven server-less architecture interface, and/or another type of SDN component. The common shared physical infrastructure may be implemented using one or more devices 1100 described below with reference to FIG. 11 in a cloud computing center associated with core network 206. Exemplary components of core network 206 are described below with reference to FIG. 4.

As shown, core network 206 may include one or more network slices 212. Depending on the implementation, network slices 212 may be implemented within other networks, such as access network 204 and/or data network 208. Access network 204, core network 206, and data network 208 may include multiple instances of network slices 212. Each network slice 212 may be instantiated as a result of "network slicing," which involves a form of virtual network architecture that enables multiple logical networks to be implemented on top of a shared physical network infrastructure using the SDN and/or network function virtualization (NFV). Each logical network, referred to as a "network slice," may encompass an end-to-end virtual network with dedicated storage and/or computational resources that include access network components, clouds, transport, Central Processing Unit (CPU) cycles, memory, etc. Furthermore, each network slice 212 may be configured to meet a different set of requirements and may be associated with a particular Quality of Service (QoS) class, a type of service, 5QI, and/or a particular group of enterprise customers associated with communication devices.

Each network slice 212 may be associated with an identifier, herein referred to as a Single Network Slice Selection Assistance Information (S-NSSAI) and/or a network slice instance ID. Each UE 202 that is configured to access a particular network slice may be associated with corresponding subscription data, stored in core network 206 for example, that includes the S-NSSAI corresponding to the network slice.

Data network 208 may include one or more networks connected to core network 206. In some implementations, a particular data network 208 may be associated with a data network name (DNN) in 5G, and/or an Access Point Name (APN) in 4G, and a UE 202 may request a connection to data network 208 using a DNN or APN. Data network 208 may include, and/or be connected to and enable communication with, a local area network (LAN), a wide area network (WAN), a metropolitan area network (MAN), an autonomous system (AS) on the Internet, an optical network, a cable television network, a satellite network, another wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Data network 208 may include an application server (also simply referred to as application). An application may provide services for a program or an application running on UE 202 and may establish communication session with UE 202 via core network 206.

Although not shown in FIG. 2, network 200 may include a transport network to bridge access network 204 and core network 206. Such a transport network may include a transport system 214 and one or more components of access network 204 and/or core network 206. As indicated above, transport system 214 may support network slice services. Transport system 214 may receive tunnel contexts from access network 204 and/or core network 206 and use the contexts to generate, for each transport device, a corresponding map of the contexts to queues within the transport device. Each transport device may use the map to achieve a fine-grained control over traffic shaping and packet scheduling to effectively meet SLAs for each service or flow to/from network slices 212.

Depending on the implementation, network 200 may include additional networks and components than those illustrated in FIG. 2. For clarity, however, FIG. 2 does not show all components that may be included in environment 200 (e.g., routers, bridges, wireless access point, additional UE devices, switches, etc.).

Figure 3:
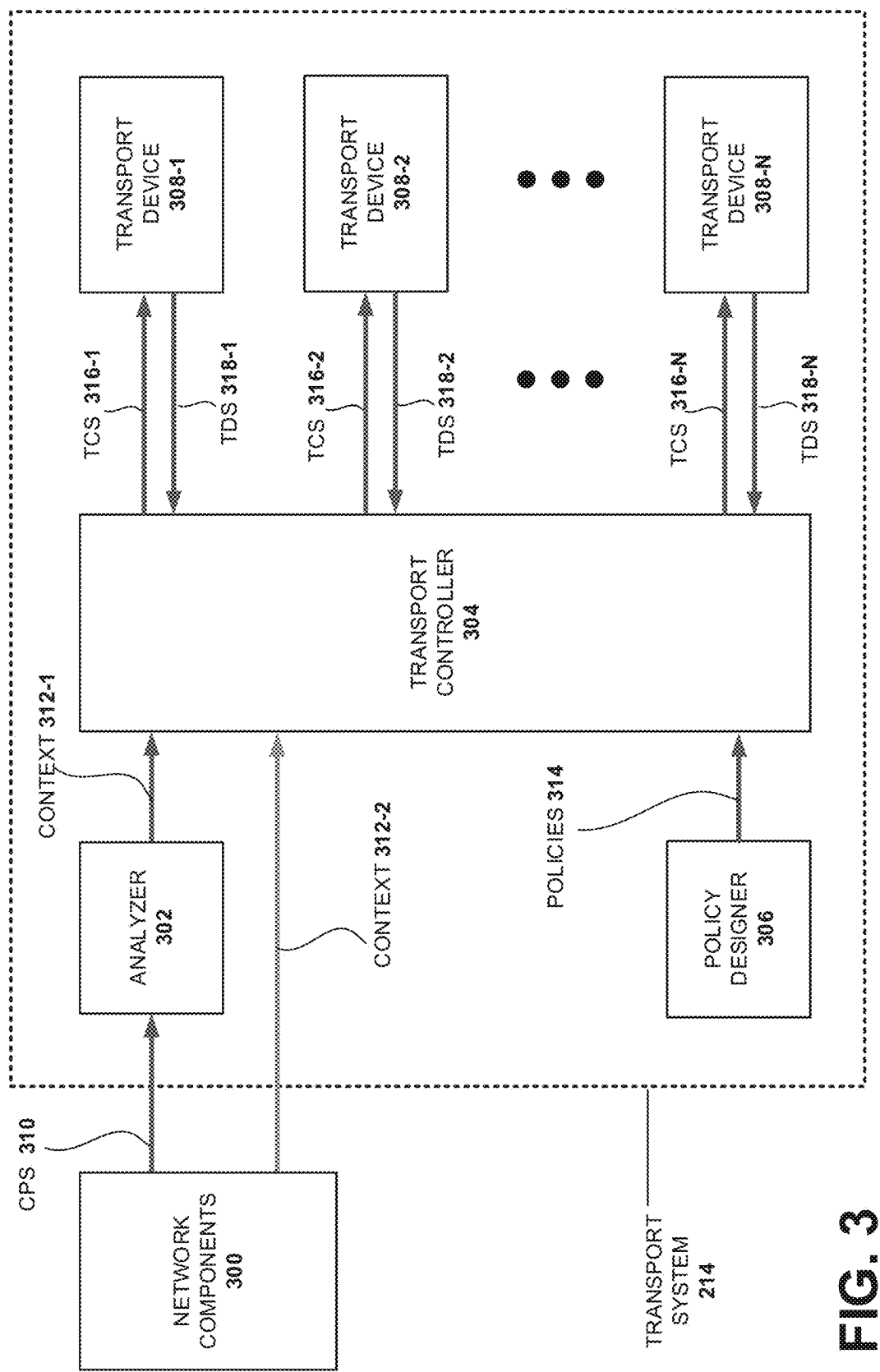
FIG. 3 depicts exemplary components of a transport system, according to an implementation.

FIG. 3 depicts exemplary components of transport system 214 according to an implementation. As shown, transport system 214 may include an analyzer 302, a transport controller 304, a policy designer 306, and transport devices 308-1 through 308-N(collectively referred to as transport devices 308 and generically as transport device 308). Depending on the implementation, transport system 214 may include additional, fewer, different or a different arrangement of devices than those shown in FIG. 3.

Network components 300 may include components of access network 204 and/or core network 206. These components may provide control plane signals (CPS) 310 (including Key Performance Indicators (KPIs)), and contexts 312-2 to analyzer 302 and transport controller 304. CPS 310 may include signals from which analyzer 302 can obtain the context and a TEID; and contexts 310-2 may include 4-tuples (i.e., UE-ID, 5QI, a network slice ID, and a DRB-ID). The KPIs may include parameters that pertain to one or more sessions, DRBs, UEs, etc., such as a delay, jitter, throughput, etc. Network components 300 may provide CPS 310, contexts 310-2 and the KPIs either in response to requests from analyzer 302 and transport controller 304 or as part of its notification services.

Analyzer 302 may receive CPS 310 from network components 300 and extract, from CPS 310, GTP-U tunnel contexts and packet information (e.g., TEID, UE-ID, source IP address, destination IP address, port numbers, etc.). Analyzer 302 may forward the extracted GTP-U contexts to a tunnel context database in transport controller 304, via database services exposed by a database manager (e.g., insert, delete, and update services).

Transport controller 304 may receive contexts 312-1 from analyzer 302, contexts 312-2 from network components 300, and/or policies 314 from policy designer 306. Transport controller 304 may use contexts 312, policies 314, and/or KPIs (not shown) to generate, for each transport device 308, a corresponding map and instructions. Given a transport device, the map designates or assigns contexts to queues within the transport device 308. The instructions may specify parameters for traffic shaping and scheduling, as well as other parameters associated with processing packets. As shown, transport controller 304 may send the map and the instructions to transport devices 308 as part of Transport Control Signals (TCS) 316-1 through 316-M (collectively referred to as TCSs 316 and generically as TCS 316). Transport controller 304 may receive transport device signals (TDS) 318-1 through 318-M from transport devices 308. TDS 318 may include values of monitored parameters and responses to queries from transport controller 304. Transport controller 304 may use information that TDS 318 provides in updating device models, as explained below with reference to FIG. 5.

Policy designer 306 may receive user inputs for designing traffic flow policies (e.g., rules on how to treat traffic flows that are part of a DRB) for different flow types. The user input may specify properties and/or requirements per UE, per slice, and per 5QI, for example, when not combined as a DRB. Based on user input and/or other parameters (e.g., parameters from NWDAF 416), policy designer 306 may generate the traffic flow policies 314 and send traffic flow policies 314 to transport controller 304 (e.g., distribute policies to a policy database in transport controller 304) in accordance with user instructions. The generated traffic flow policies 314 may include: flow policies that specify or refer to Committed Information Rate (CIR), Excess Information Rate (EIR), weights for flows and/or network slices 212; Weighted Random Early Detection (WRED) policies (e.g., policies for setting queueing thresholds for PDUs with different properties); DRB policies that refer to uplink (UL) and/or downlink (DL) properties; etc.

Transport devices 308 may include devices within transport domains. A transport domain may extend, for example, from an edge of access network 204 to an edge of core network 206 (e.g., a mid-haul network). Transport device 308 may be implemented as a router, a switch, a gateway, or another device within the transport domain. Transport device 308 may receive TCS 316, which includes a map and configuration instructions, from transport controller 304; use the map to assign each context to a queue within the device 308 and use the instructions to configure traffic shaping, PDU scheduling, and/or other PDU processing.

Each transport device 308 may monitor different parameters, such as flow throughput, delay, jitter, number of packets dropped per queue, average queue-size, etc., and provide the monitored values of the parameters to transport controller 304.

Figure 4:
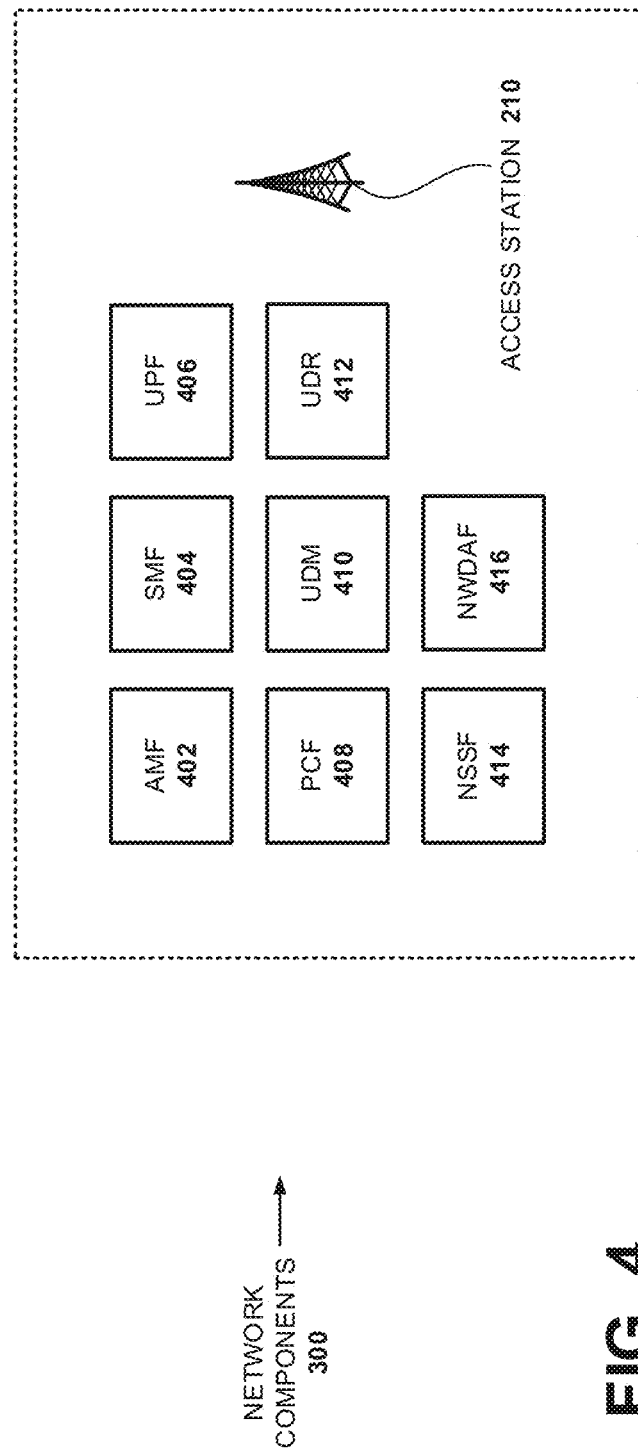
FIG. 4 illustrates exemplary components, of a core network and an access network, that may provide contexts to a transport system, according to an implementation.

FIG. 4 illustrates exemplary network components 300, in access network 204 and core network 206, that may provide CPS 310 to analyzer 302 and contexts 312 to transport controller 304, according to an implementation. As shown, network components 300 may include core network components, such as an Access and Mobility Management Function (AMF) 402, a Session Management Function (SMF) 404, a user Plane Function (UPF) 406, a Policy Control Function (PCF) 408, a Unified Data Management (UDM) 410, a Unified Data Repository (UDR) 412, a Network Slice Selection Function (NSSF) 414, and a Network Data Analytics Function (NWDAF) 416, as well as access network components, such as an access station 210. Each of components 402-416 and 210 may include network device 1100 or be implemented on one or more network devices 1100. Depending on the implementation, network components 300 may include additional, fewer, and/or different 5G core network components and/or access network components than those illustrated in FIG. 4.

AMF 402 may perform registration management, connection management, reachability management, mobility management, lawful intercepts, Short Message Service (SMS) transport between UE 202 and a Short Message Service Function (SMSF), session management messages transport between UE 202 and SMF 404, access authentication and authorization, location services management, functionality to support non-Third Generation Partnership Program (3GPP) access networks, and/or other types of management processes. When AMF 402 receives UE-related requests from access station 210 (a request to establish a session). AMF 402 may obtain a number of parameters, such as UE-ID, 5QI, etc. AMF 402 may be configured to provide such parameters to analyzer 302, for example.

SMF 404 may perform session establishment, session modification, and/or session release, perform Internet Protocol (IP) address allocation and management, perform Dynamic Host Configuration Protocol (DHCP) functions, perform selection and control of UPF 406, configure traffic steering at UPF 406 to guide the traffic to the correct destinations, terminate interfaces toward PCF 408, perform lawful intercepts, charge data collection, support charging interfaces, control and coordinate of charging data collection, terminate session management parts of Non-Access Stratum (NAS) messages, perform downlink data notification, manage roaming functionality, and/or perform other types of control plane processes for managing user plane data. When SMF 404 receives requests from a gNB or a CU-CP to establish a session, for example, SMF 404 may obtain one or more of a 4-tuple context. SMF 404 may be configured to provide the obtained values to analyzer 302 and/or transport controller 304 as a context. In some implementations, SMF 404 may provide network slice-related information (e.g., traffic congestion) to transport controller 304, to aid transport controller 304 in generating maps for transport devices 308.

UPF 406 may maintain an anchor point for intra/inter-RAT mobility, maintain an external PDU point of interconnect to a particular data network (e.g., data network 208), perform packet routing and forwarding, perform the user plane part of policy rule enforcement, perform packet inspection, perform lawful intercept, perform traffic usage reporting, perform Quality of Service (QoS) handling in the user plane, perform uplink traffic verification, perform transport level packet marking, perform downlink packet buffering, forward an "end marker" to a RAN node (e.g., gNB), and/or perform other types of user plane processes. During exchange of signals between SMF 404 and UPF 406, UPF 406 may obtain components of a 4-tuple context. UPF 406 may be configured to provide one or more of the 4-tuple context to either analyzer 302 and/or to transport controller 304.

PCF 408 may support policies to control network behavior, provide policy rules to control plane functions (e.g., to SMF 404), access subscription information relevant to policy decisions, perform policy decisions, and/or perform other types of processes associated with policy enforcement.

UDM 410 may maintain subscription information for UEs 202, manage subscriptions, generate authentication credentials, handle user identification, perform access authorization based on subscription data, perform network function registration management, maintain service and/or session continuity by maintaining assignment of SMF 404 for ongoing sessions, support SMS delivery, support lawful intercept functionality, and/or perform other processes associated with managing user data. UDR 412 may store information that UDM 410 manages. When analyzer 302 obtains one or more components of a 4-tuple context, and if there are UE-related information that analyzer 304 and/or transport controller 304 needs, analyzer 302 and/or transport controller 304 may query UDM 410/UDR 412 (e.g., a particular form of UE-ID (e.g., Subscription Permanent Identifier (SUPI)).

NSSF 414 may select a set of network slice instances to serve a particular UE 202, determine network slice selection assistance information (NSSAI) or a Single-NSSAI (S-NSSA), identify a particular AMF to serve a particular AMD 102, and/or perform other types of processing associated with network slice selection or management. Analyzer 302 and/or transport controller 304 may, if necessary, query NSSF 414 to verify network slice information for a particular UE 202.

NWDAF 416 may collect analytics information associated with radio access network 120 and/or core network 206. For example, NWDAF 416 may collect accessibility Key Performance Indicators (KPIs) (e.g., a Radio Resource Control (RRC) connection setup success rate, a Radio Access Bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

NWDAF 416 may be configured to provide one or more of the KPIs to transport controller 304 for generating maps and/or instructions for configuring transport devices 308. In some implementations, NWDAF 416 may provide some KPIs to policy designer 306, to aid in designing flow policies.

Access station 210 may provide one or more components of a 4-tuple context to analyzer 302 and/or transport controller 304. As used herein, the term "access station" may refer not only to a base station (e.g., gNB) but also to a CU-CP, a CU-UP, and/or a DU.

Figure 5:
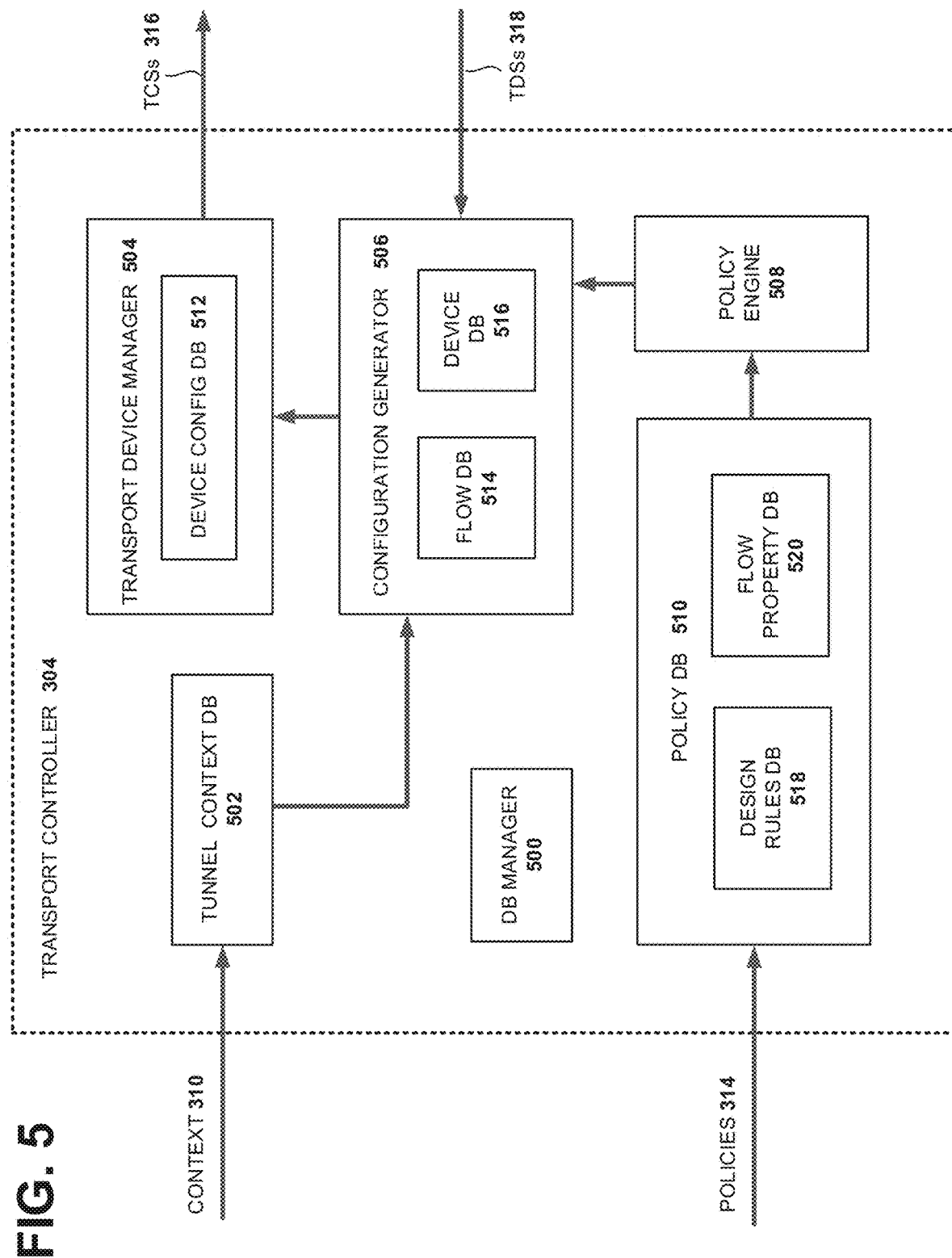
FIG. 5 shows exemplary components of a transport controller in a transport system, according to an implementation.

FIG. 5 shows exemplary components of transport controller 304 according to an implementation. As shown, transport controller 304 may include a database (DB) manager 500, a tunnel context DB 502, a transport device manager 504, a configuration generator 506, a policy engine 508, and a policy DB 510. Depending on the implementation, transport controller 304 may include additional, fewer, different, or a different arrangement of components than those shown in FIG. 5.

DB manager 500 may expose services to insert, delete, and/or update database entries for each database that may be included in transport controller 304 (e.g., DB 502, 512, 514, 516, 518, or 520 or other databases not shown in FIG. 5). For example, DB manager 500 may receive designs (e.g., from Open Network Automation Platform (ONAP) Service Design Center (SDC)). DB manager 500 may provide notification services to database subscribers (e.g., configuration generator 506). For example, if configuration generator 506 is subscribed to the notification service for DB 502, DB manager 500 may notify configuration generator 506 when a new database record is inserted into DB 502 or an old record in DB 502 is updated.

Tunnel context DB 502 may include contexts from network components 300 and/or analyzer 302. Configuration generator 506 may access tunnel context DB 502 via DB manager 500. In some implementations, when a tunnel context in tunnel context DB 502 changes, DB manager 500 may notify configuration generator 506.

Transport device manager 504 may configure transport devices 308. More specifically, transport device manager 504 may use a device model (received from configuration generator 506) to generate instructions for transport devices 308 and send the model and/or the instructions as part of a transport control signals (TCS) 316. When generating instructions, transport device manager 504 may take into account physical device settings, parameters, and configurations that are stored in a device configuration DB 512. In some implementations, transport device manager 504 may use per-device-type plugins that handles each device type. Device-type plugins may be retrieved from device configuration DB 512.

Configuration generator 506 may generate maps for configuring transport devices 308 and forward the maps to transport device manager 504. Each map may indicate how logical flows are assigned to particular ingress queues of a transport device 308, as well as parameter values for traffic shaping and policing at a particular transport device 308.

Configuration generator 506 may generate a map when configuration generator 506 is notified of or detects a new logical flow. In response to a notification, configuration generator 506 assigns a new logical flow ID to the new flow. Configuration generator 506 may store information pertaining to the flow in a logical low DB 514.

As indicated above, configuration generator 506 may include a device DB 516. Device DB 516 may include parameters of an abstracted device model of a transport device 308. For example, device DB 516 may include two models corresponding to two types of transport devices from different vendors, each with a different number of ports. A device model may be complete when configuration generator 506 generates a map for the device model and stores the map with other information in device DB 516.

To generate a map, configuration generator 506 may apply design policy rules and flow policy rules (e.g., a policy for a traffic flow) to information in a device model. By applying the policies, configuration generator 506 may generate a map that completes the device model, where the map assigns a flow to an ingress port of a particular transport device 308, as well as contexts to queues in transport device 308. Configuration generator 506 may forward each completed device model (e.g., model specific parameter values and the map for the device 308) to transport device manager 504.

Because some information in device DB 516 may depend on the operating parameters of each transport device 308, configuration generator 506 may update device models in device DB 516 based on device parameter values received from transport devices 308, as transport device signals (TDSs) 318. TDSs 318 may comprise monitored parameter values at each transport device 308 (e.g., device load, throughput, processor utilization, memory used, etc.). Configuration generator 506 may store the parameter values as part of device models in device DB 516. In a different implementation, transport device manager 504 may receive TDSs 318 and use the information in TDSs 318 to update device configuration DB 512.

Policy engine 508 may store design rules in design rules DB 518 in policy DB 510 and provide or push these rules to configuration generator 506. The design rules in design rules DB 518 may specify how to determine properties of traffic flows. Design rules may specify, for example, how to combine each of UE properties, slice properties, and 5QI properties to obtain priorities of the flows. More specifically, for example, a rule may specify how to determine the final priority of a flow in accordance with the rule that defines the priority as the product of a 5QI and a network slice priority. In another example, a design rule may specify how to determine an excess information rate (EIR) for a flow as the minimum of UE maximum throughput and the 5QI EIR.

Policy engine 518 may store flow policies in flow properties DB 520 in policy DB 510 and provide or push these rules to configuration generator 506. The flow policy rules in flow properties dB 520 may specify how to modify flow properties. For example, a rule may specify promoting a best effort flow type (identified by a 5QI) within a DRB as a guaranteed bit rate (GBR) flow (e.g. a video stream or a video flow) but not promoting the flow as a delay critical GBR (DC GBR) (e.g., a control loop flow).

FIG. 6 illustrates a table 600 that summarizes how transport system 214 maps flows to DRBs. In the example of FIG. 6, transport system 214 manages 7 unique flows with 5QIs (see column 1 of table 600). Each flow, which may be associated with a particular 5QI, has a maximum commit bit rate and a minimum latency budget per hop. As further shown, these flows are mapped to DRBs. For example, assume that GRB flow 3, 4, and 6 have the maximum commit rate of 20 Mbps (from 5QI of 4 in table 600). The flows would be assigned to the DRB with the DRB-ID of 3.

Figure 7:
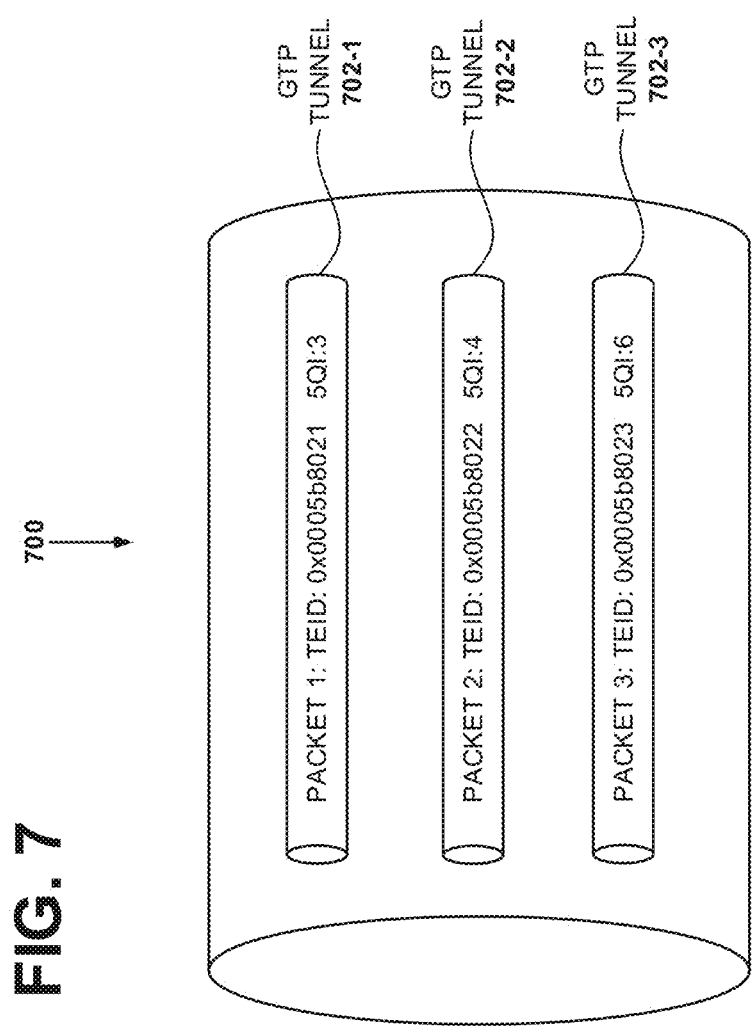
FIG. 7 depicts how a transport system handles individual packets of a DRB, according to an implementation.

FIG. 7 illustrates how transport system 214 might handles individual packets according to an implementation of FIG. 6. Each packet (e.g., 1, 2 and 3) may map to a unique 5QI (e.g., 3, 4, and 6). Assume that the packets arrive over a dedicated GTP tunnels 702-1. 702-2, and 702-3. The flows of the GTP-U tunnels 702 are aggregated into a DRB 700 due to similar QoS flow properties. In this implementation, other flows are assigned to other DRBs in accordance with table 600.

FIG. 8A shows an example mapping 800 between different network services and 5QIs, according to an implementation. Mapping 800 may occur during operation of transport system 214. As shown, each network service (e.g., an enhanced mobile broadband (eMBB) gold service, an eMBB silver service, a Push-to-Talk (PTT) service, and a high-definition video (HD VIDEO) service) may be associated with a particular network slice with a particular priority. Each network slice may support multiple 5QIs.

FIG. 8B shows an example mapping (table) 850 between a combination of a UE and a network slice and a DRB, according to an implementation. Mapping 850 may occur as a result of operating transport system 214. As shown, the first column in table 850 shows a combination of UE and network slice. A particular UE may request one or more network slices and this is reflected in column 1. Columns 2, 3, and 4 show a 5QI, a priority for the 5QI and a slice priority, respectively, for each of the UE/slice combinations in column 1. Column 5 indicates which DRB carries the packets for the network slices of column 1.

Figure 9:
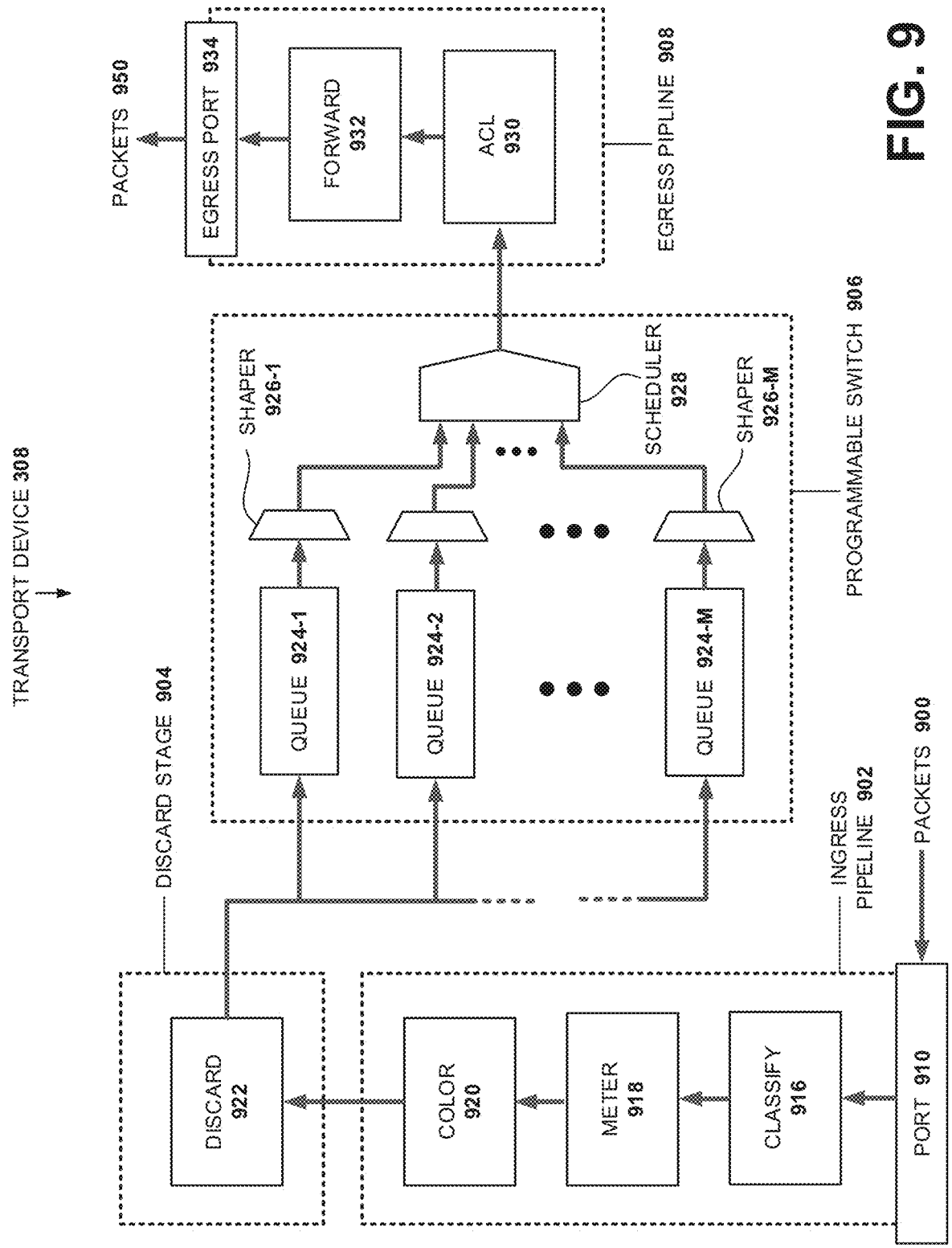
FIG. 9 illustrates exemplary components of a programmable network transport device and an exemplary processing that is performed at the transport device.

FIG. 9 depicts exemplary components of transport device 308 and exemplary processing that is performed at the transport device 308. As shown, transport device 308 may include an ingress pipeline 902, a discard stage 904, a programmable switch 906, and an egress pipeline 908. Depending on the implementation, transport device 308 may include fewer, additional, different, or a different arrangement of components than those depicted in FIG. 9.

Ingress pipeline 902 may receive packets through one or more ingress ports 910 and pre-process packets in preparation for packet discarding, traffic shaping, and scheduling. For example, as part of the pre-processing, ingress pipeline 902 may classify 916 packets based on the flow identifiers of the packets and meter 918 the packets. Metering 918 the packets may include, for example, not only counting the packets of a flow, but also obtaining the number of bytes carried by the packets, the number of packets and bytes in reference to a TEID, a UE-ID. And/or a 5QI for the flow, etc. After metering 918 the packets, ingress pipeline 902 may color 920 the packets. Coloring 920 may include determining the priorities at which the packets were before they were received at the transport device 308. After coloring 920 the packets, ingress pipeline 902 may forward the packets to discard stage 904.

Discard stage 904 may select and discard packets that are received from ingress pipeline 902. Discard stage 904 may discard packets based on a packet priority/color, a 5QI, a TEID, a UE-ID, and/or another packet characteristic. Discard stage 904 may forward packets that have not been discarded to programmable switch 906.

Programmable switch 906 may sort and distribute the packets into different queues 924-1 though 924-M, where each queue 924 is assigned to one or more context values and where each context value comprises a combination of a UE-ID, a 5QI, a network slice ID, and a DRB (i.e., a 4-tuple). The packets from each queue 924 may be provided to a traffic shaper 926 (e.g., one of traffic shapers 926-1 through 926-M). Traffic shaper 926 may slow or speed certain packets based on packet characteristics (e.g., a 5QI, a packet priority, etc.). Traffic shapers 926 may then pass the packets to a scheduler 928. Scheduler 928 may schedule the packets for transmission/forwarding. Programmable switch 906 may convey the scheduled packets to egress pipeline 908.

Egress pipeline 908 may apply access control lists (ACL) 930 to each of the packets from programmable switch 906. ACL 930 may include a list of access controls (criteria) to filter packets. By applying ACL 930, egress pipeline 908 may restrict or limit the flow of traffic, restrict the access by users and devices to a network slice or a network, and/or prevent the traffic from leaving a network. Example applying ACL 930 may prevent packets with a particular source IP address, a particular destination IP address, etc. from being forwarded to another network device. After applying ACL 930, egress pipeline 908 may forward 932 each of the packets to a particular port 932 for transmission to a node in the network.

Transport device 308 may receive, from transport device manager 904, TCS 316 that includes a map (or a device model) and configuration instructions. The device model and configuration instructions may specify parameter values for ingress pipeline 902, discard stage 904, programmable switch 906, and egress pipeline 908. The configuration instructions may specify, for example: packet types into which packets may be classified 916, metering 918 requirements (e.g., what parameter to measure, such as the number of packets or bytes received by transport device 308 for a particular TEID, UE-ID, etc.), coloring 920 configuration (e.g., a priority to which each packet is to be assigned based on its context), discarding 922 requirements, a map (or device model) that indicates which queue 924 is to be assigned to which 4-tuple contexts, traffic shaper 926 parameters (e.g., delays for different packets), scheduling 928 parameters (e.g., an order of precedence for scheduling packets from queues 924), and criteria for ACL 930 (e.g., banned destination IP addresses or source IP addresses). Upon receipt of TCS 316, transport device 308 may configure its ingress pipeline 902, discard stage 904, programmable switch 906, and/or egress pipeline 908 in accordance with the map and configuration instructions in TCS 916.

Figure 10:
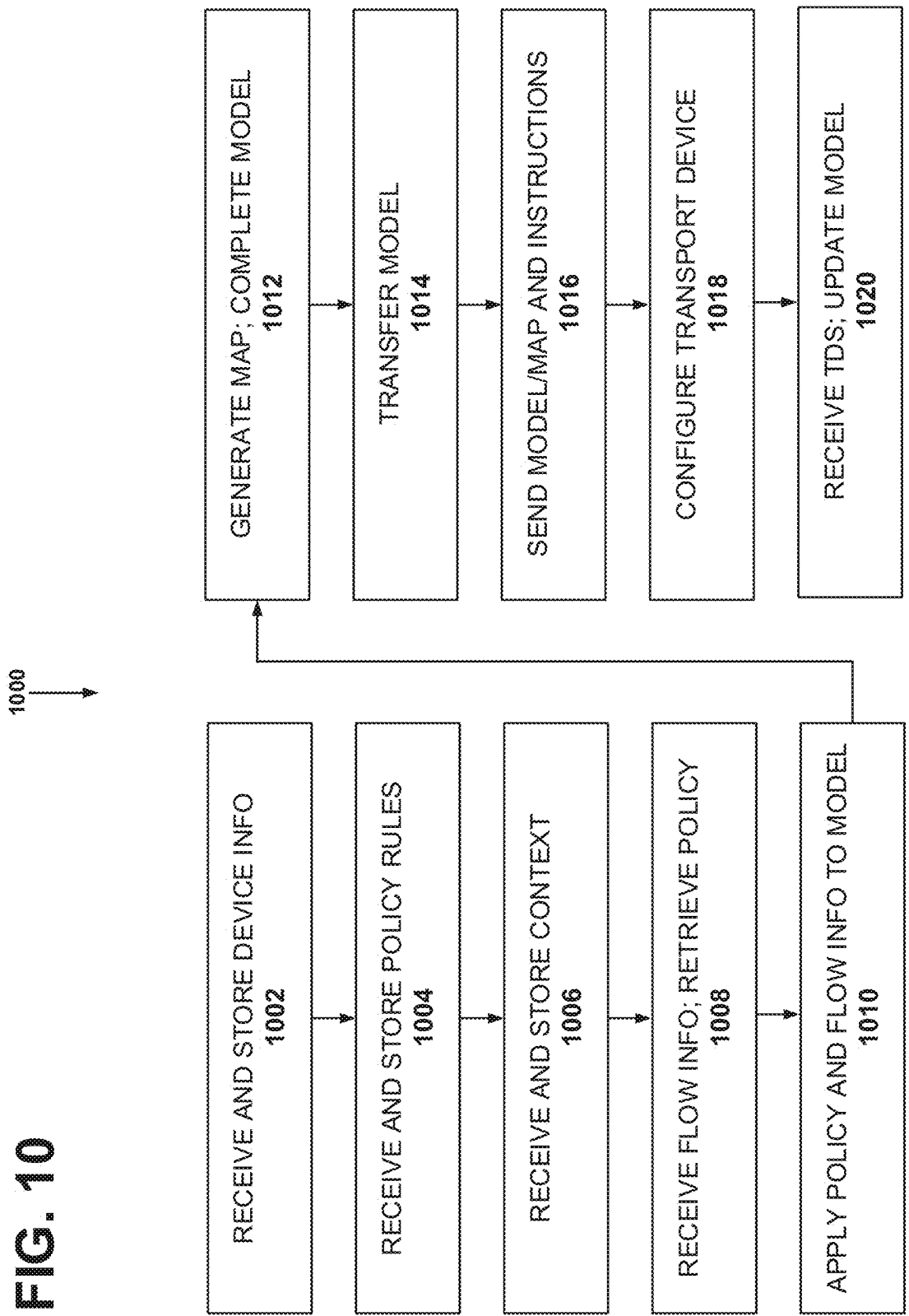
FIG. 10 is a flow diagram of an exemplary process that is associated with a transport system, according to an implementation.

FIG. 10 is a flow diagram of an exemplary process 1000 that is associated with transport system 214. Process 1000 may be performed by network components 300 and/or components of transport system 214. As shown, process 1000 may include receiving transport device information (block 1002). The device information may be provided by a network device, a network operator, an administrator, etc. When transport controller 304 in system 214 receives the information, transport controller 304 may store the information as a device model in device DB 516 of configuration generator 506 and/or as parameters in device configuration DB 512 in transport device manager 504.

Process 1000 may further include receiving and storing policy rules from policy designer 306 (block 1004). For example, a network administrator may use policy designer 306 to design policy rules and have policy designer 306 forward the designed policy rules to policy DB 510. If the policy rules pertain to modifying flow properties, the rules may be stored in flow properties DB 520. If the rules specify using different components of a context (i.e., the elements of a 4-tuple) to arrive at a priority for the flow, the rules may be stored in design rules DB 518.

Process 1000 may further include receiving and storing a flow context (block 1006). For example, network components 300 (e.g., gNB) may send a 4-tuple as a context to transport controller 304 in transport system 214. Database manager 500 may receive the context and store the context in tunnel context DB 502.

When tunnel context DB 502 stores a new flow context, DB manager 500 may notify configuration generator 506 in transport controller 304 with new flow information. When configuration generator 805 receives the flow information (block 1008), configuration generator 506 may assign a new flow ID to the flow and store the flow ID with the flow information in flow DB 514. Furthermore, configuration generator 506 may query policy engine 508 to retrieve policy rules applicable to the flow, from design rules DB 518 and flow properties DB 520 (block 1008). Policy engine 510 may retrieve and provide the requested rules to configuration generator 506.

Process 1000 may further include configuration generator 506 applying the policy rules provided by policy engine 508 and the flow information (received from tunnel context DB 502 (block 1010). By applying the rules, configuration generator 506 may generate a map that assigns queue of transport devices 308 to contexts (block 1012). Context generator 506 may combine the map with the device information to complete a device model (block 1012). Configuration generator 506 may send the completed device model to transport device manager 504 (block 1014).

When transport device manager 504 receives the device model, transport device manager 504 may generate a set of instructions and/or configuration parameters for one or more target transport devices 308. Transport device manager 504 may send the model/map and the generated configuration instructions/settings to the transport devices (block 1018), as TCS 316. When transport devices 308 receive the maps and/or the instructions, each transport device 308 may configure its internal components, such as ingress pipeline 902, discard stage 904, programmable switch 906, and egress pipeline 908 (block 1018), as described above with reference to FIG. 9.

The transport devices 308 may process packets of the new flow in accordance with their new configurations. During their operation, transport devices 308 may provide TDSs 318 to transport controller 304 (e.g., have configuration generator 506 update its device DB 416) (block 1020).

Figure 11:
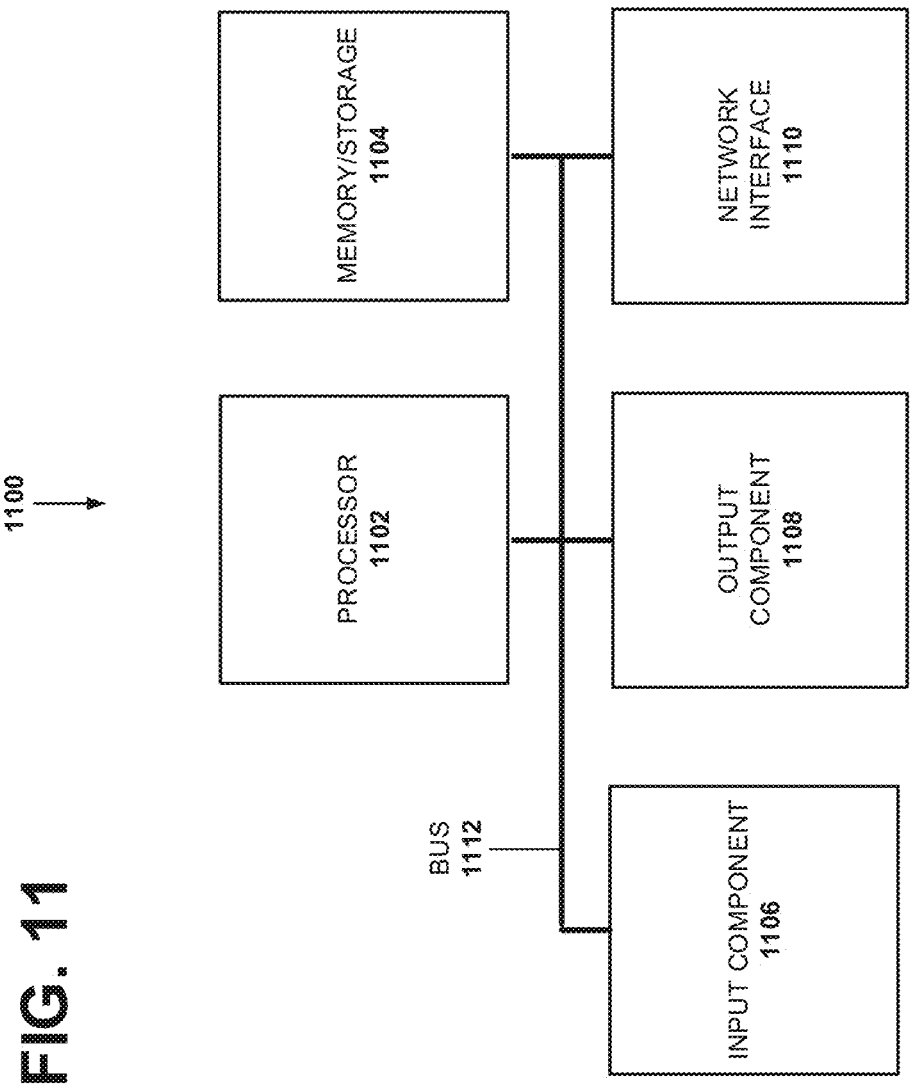
FIG. 11 shows exemplary components of a network device, according to an implementation.

FIG. 11 depicts exemplary components of an exemplary network device 1100. Network device 1100 may correspond to or be included in any of the devices and/or components illustrated in FIGS. 1-5 and 9 (e.g., UE 202, access network 204, core network 206, data network 208, access station 210, transport system 214, NFs 402-416, components in transport device 308, etc.). In some implementations, network devices 1100 may be part of a hardware network layer on top of which other network layers and NFs may be implemented.

As shown, network device 1100 may include a processor 1102, memory/storage 1104, input component 1106, output component 1108, network interface 1110, and communication path 1112. In different implementations, network device 1100 may include additional, fewer, different, or different arrangement of components than the ones illustrated in FIG. 12. For example, network device 1100 may include line cards, switch fabrics, modems, etc.

Processor 1102 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 1100 and/or executing programs/instructions.

Memory/storage 1104 may include static memory, such as read only memory (ROM), and/or dynamic memory, such as random access memory (RAM), or onboard cache, for storing data and machine-readable instructions (e.g., programs, scripts, etc.).

Memory/storage 1104 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 1104 may be external to and/or removable from network device 1100. Memory/storage 1104 may include, for example, a Universal Serial Bus (USB) memory stick, a dongle, a hard disk, off-line storage, a Blu-Ray® disk (BD), etc. Memory/storage 1104 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 1106 and output component 1108 may provide input and output from/to a user to/from network device 1100. Input/output components 1106 and 1108 may include a display screen, a keyboard, a mouse, a speaker, a microphone, a camera, a DVD reader, USB lines, and/or other types of components for obtaining, from physical events or phenomena, to and/or from signals that pertain to network device 1100.

Network interface 1110 may include a transceiver (e.g., a transmitter and a receiver) for network device 1110 to communicate with other devices and/or systems. For example, via network interface 1110, network device 1100 may communicate over a network, such as the Internet, an intranet, cellular, a terrestrial wireless network (e.g., a WLAN, WIFI, WIMAX, etc.), a satellite-based network, optical network, etc. Network interface 1110 may include a modem, an Ethernet interface to a LAN, and/or an interface/connection for connecting network device 1100 to other devices (e.g., a Bluetooth interface).

Communication path or bus 1112 may provide an interface through which components of network device 1100 can communicate with one another.

Network device 1100 may perform the operations described herein in response to processor 1102 executing software instructions stored in a non-transient computer-readable medium, such as memory/storage 1104. The software instructions may be read into memory/storage 1104 from another computer-readable medium or from another device via network interface 1110. The software instructions stored in memory/storage 1104, when executed by processor 1102, may cause processor 1102 to perform one or more of the processes that are described herein.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while series of messages, signals, and acts have been described with FIGS. 9 and 10, the order of the messages, signals, and acts may be modified in other implementations. In addition, non-dependent messages, signals, and acts may represent messages, signals, and acts can be sent, received, and/or performed in parallel and in different orders.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising one or more devices configured to:
   receive a context associated with a flow of packets between a User Equipment device (UE) and a network slice in a wireless network;
   obtain one or more policy rules;
   apply the policy rules to the context and a model of a transport device to generate or update a map that assigns one or more contexts to queues within the transport device; and
   send the map to the transport device,
   wherein the transport device is configured to:
   adjust parameters of the queues based on the map;
   shape traffic from each of the queues;
   schedule packets from the queues; and
   forward the scheduled packets,
   wherein the one or more policy rules comprise a rule for deriving a priority associated with the flow by obtaining a product of a network slice priority and a Fifth Generation Quality of Service Index (5QI) priority.

2. The system of claim 1, wherein the context includes one or more of:
   a 5QI;
   a UE-ID;
   a network slice ID; or
   a data radio bearer ID (DBR-ID).

3. The system of claim 1, wherein when the one or more devices receive the context, the one or more devices are configured to receive the context from at least one of:
   a next-generation node B (gNB) in a radio access network; or
   a central unit (CU) in a radio access network.

4. The system of claim 1, wherein the transport device comprises one of:
   a switch;
   a router; or
   a User Plane Function (UPF).

5. The system of claim 1, wherein the one or more devices comprise a policy designer configured to:
   receive user input for designing the one or more policy rules; and
   generate the one or more policy rules.

6. The system of claim 1, wherein the context comprises information pertaining to a Protocol Data Unit (PDU) session between the UE and the network slice.

7. The system of claim 1, wherein the context includes parameters of a General Packet Radio Service (GPRS) tunneling protocol-User Plane (GTP-U).

8. The system of claim 1, wherein the transport device is further configured to one or more of:

meter the packets;
color the packets;
classify the packets;
discard one of more packets from the packets; or
apply an access control list (ACL) to the packets.

9. A method comprising:
receiving, by one or more devices, a context associated with a flow of packets between a User Equipment device (UE) and a network slice in a wireless network;
obtaining one or more policy rules;
applying the policy rules to the context and a model of a transport device to generate or update a map that assigns one or more contexts to queues within the transport device; and
sending the map to the transport device,
wherein the transport device is configured to:
    adjust parameters of the queues based on the map;
    shape traffic from each of the queues;
    schedule packets from the queues; and
    forward the scheduled packets,
        wherein the one or more policy rules comprise a rule for deriving a priority associated with the flow by obtaining a product of a network slice priority and a Fifth Generation Quality of Service Index (5QI) priority.

10. The method of claim 9, wherein the context includes one or more of:
a 5QI;
a UE-ID;
a network slice ID; or
a data radio bearer ID (DBR-ID).

11. The method of claim 9, receiving the context includes receiving the context from at least one of:
a next-generation node B (gNB) in a radio access network; or
a central unit (CU) in a radio access network.

12. The method of claim 9, wherein the transport device comprises:
a switch;
a router; or
a User Plane Function (UPF).

13. The method of claim 9, wherein the one or more devices comprise a policy designer configured to:
receive user input for designing the one or more policy rules; and
generate the one or more policy rules.

14. The method of claim 9, wherein the context comprises information pertaining to a Protocol Data Unit (PDU) session between the UE and the network slice.

15. The method of claim 9, wherein the context includes parameters of a General Packet Radio Service (GPRS) tunneling protocol-User Plane (GTP-U).

16. The method of claim 9, wherein the transport device is further configured to one or more of:
meter the packets;
color the packets;
classify the packets;
discard one of more packets from the packets; or
apply an access control list (ACL) to the packets.

17. A non-transitory computer-readable medium comprising processor-executable instructions, which when executed by one or more processors, cause the one or more processors to:
receive a context associated with a flow of packets between a User Equipment device (UE) and a network slice in a wireless network;
obtain one or more policy rules;
apply the policy rules to the context and a model of a transport device to generate or update a map that assigns one or more contexts to queues within the transport device; and
send the map to the transport device,
wherein the transport device is configured to:
    adjust parameters of the queues based on the map;
    shape traffic from each of the queues;
    schedule packets from the queues; and
    forward the scheduled packets,
        wherein the one or more policy rules comprise a rule for deriving a priority associated with the flow by obtaining a product of a network slice priority and a Fifth Generation Quality of Service Index (5QI) priority.

18. The non-transitory computer-readable medium of claim 17, wherein the context includes one or more of:
a 5QI;
a UE-ID;
a network slice ID; or
a data radio bearer ID (DBR-ID).

19. The non-transitory computer-readable medium of claim 17, wherein the transport device comprises one of:
a switch;
a router; or
a User Plane Function (UPF).

20. The non-transitory computer-readable medium of claim 17, wherein the context comprises information pertaining to a Protocol Data Unit (PDU) session between the UE and the network slice.

* * * * *